United States Patent [19]
Kocsis

[11] Patent Number: 5,713,618
[45] Date of Patent: Feb. 3, 1998

[54] COMPACT DISC TOOL

[76] Inventor: Robert S. Kocsis, 599 Orchard Grove, Sagamore Hills, Ohio 44067

[21] Appl. No.: 691,349

[22] Filed: Aug. 2, 1996

[51] Int. Cl.[6] .................. B25J 1/00; B25B 9/04
[52] U.S. Cl. .................. 294/93; 294/16; 294/103.1
[58] Field of Search .................. 294/15, 16, 27.1, 294/32, 93–97, 100, 103.1, 104, 119.1; 29/270, 278, 758, 764

[56] References Cited

U.S. PATENT DOCUMENTS

| | | | |
|---|---|---|---|
| 2,862,757 | 12/1958 | Hutchinson | 294/94 |
| 3,282,589 | 11/1966 | Morrison | |
| 4,072,335 | 2/1978 | Tift et al. | 294/15 |
| 4,595,221 | 6/1986 | deGeus et al. | |
| 4,726,615 | 2/1988 | Goldberg | |
| 4,997,224 | 3/1991 | Pierce | |
| 5,072,982 | 12/1991 | Boss | 294/103.1 |
| 5,192,106 | 3/1993 | Kaufman | |
| 5,195,794 | 3/1993 | Hummel, Jr. et al. | 294/94 |
| 5,503,446 | 4/1996 | De Jong | 294/94 |
| 5,505,509 | 4/1996 | Vance | 294/16 |

FOREIGN PATENT DOCUMENTS 2549-872   2/1985   France ................... 294/97

*Primary Examiner*—Dean Kramer
*Attorney, Agent, or Firm*—Fay, Sharpe, Beall, Fagan, Minnich & McKee

[57] ABSTRACT

A device for handling a disk having an aperture includes a shaft having a first end and a second end. A contact surface is located on the shaft first end for contacting the first side of the disk. A claw extends away from the contact surface. The claw has a length which is greater than the thickness of the disk and includes a protrusion for contacting a second side of the disk. A foot is movably mounted adjacent the shaft contact surface in a manner spaced from the claw. The foot is used for selectively contacting the second side of the disk at a location spaced from the claw. A mechanism is provided for moving the foot to bring the foot into contact with the second side of the disk. Preferably, a longitudinally extending bore is located in the shaft and a plunger is positioned in the bore. The plunger has a first end cooperating with the foot and a second end which is acted on by an operator mounted on the shaft second end.

20 Claims, 2 Drawing Sheets

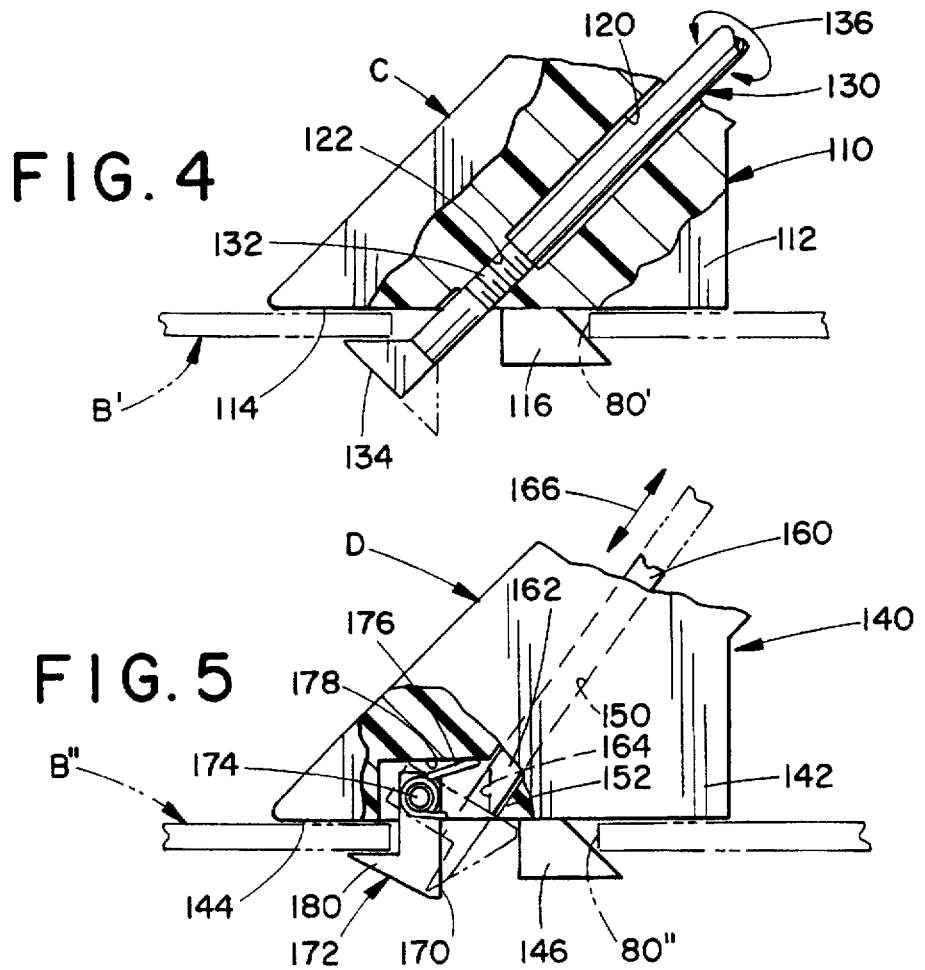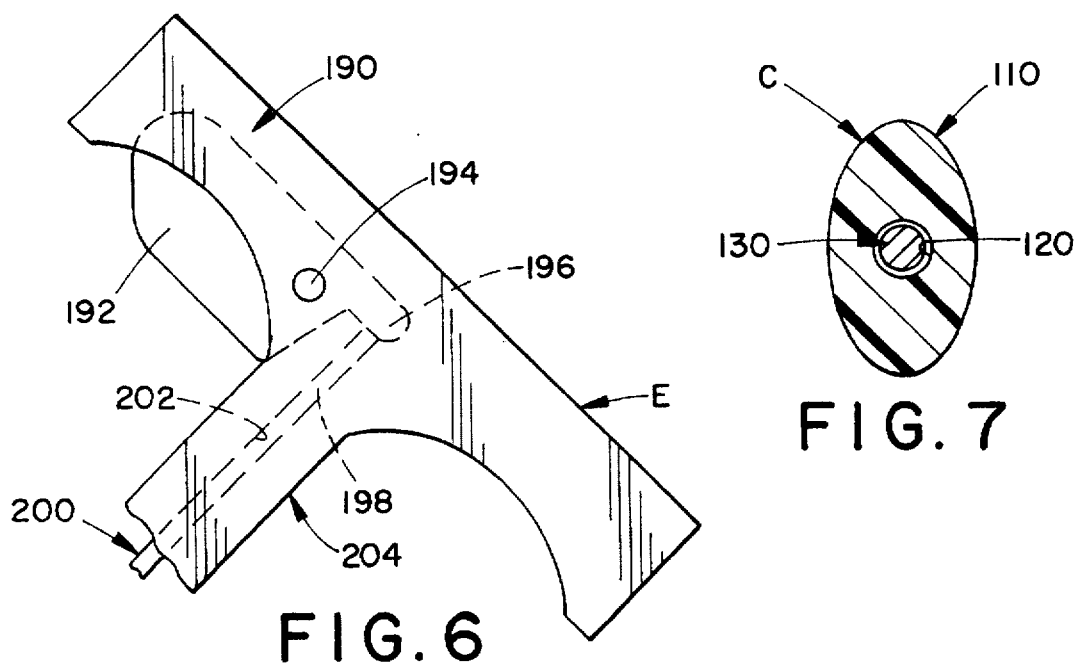

COMPACT DISC TOOL

BACKGROUND OF THE INVENTION

The present invention relates to a device for handling discs. More particularly, this invention relates to a tool for picking up and moving compact discs.

Compact discs, which can be either audio type CDs or CD-ROMS contain digital information on one side of the disc. A newer type of disc, known as a digital video disc or DVD may contain digital information on both sides. For the sake of convenience, the discs will be called CDs hereafter. For optimal performance and a long lifetime for the CD, it is best to avoid handling the disc manually in order to eliminate fingerprints, smudging, potential scratching or other types of damage. CDs are usually stored in a so-called jewel box. Handling is necessary in order to transfer the CD from its box to a CD player either in an audio compact disc single player or a carousel, or to the CD-ROM drive of a computer. Handling is also necessary to transfer the discs back into their jewel boxes. Furthermore, handling of such discs is necessary when the disc is being cleaned.

Various tools have been developed for handling disc-like objects which cannot or should not be touched on their two sides by a person's fingers. Among these, are record handling devices. There are also several compact disc handling devices which are known. One device has a central post used to disengage the compact disc from the resilient fingers which hold it in place in the jewel box, as well as two flexible arms which can grasp the outer edge of the disc. Two spring loaded plungers are provided. The first plunger is pressed down to actuate a plug and the engaging arms. The second plunger is depressed to release the grip of the arms on the rim of the compact disc. However, this device is unwieldy, complicated and has many moving parts. Also, known is a tong-like device for handling opposed edges of a compact disc. The edges can either be the outer edges of the CD or the edges of the central aperture of the disc. However, this device is disadvantageous from the standpoint that it does not allow the gripping of the aperture edges of the compact disc when the disc is in a jewel box. Also, both of the known prior art compact disc handling devices do not allow an off axis manipulation of compact discs with a simple handle controlled mechanism.

Accordingly, it has been considered desirable to develop a new and improved compact disc handling device which would overcome the foregoing difficulties and others while providing better and more advantageous overall results.

BRIEF SUMMARY OF THE INVENTION

A device is provided for handling a disc having an aperture.

More particularly, the device comprises a shaft having a first end and a second end and a contact surface located on the shaft first end for contacting a first side of the disc. A claw extends away from the contact surface. The claw has a length which is greater than the thickness of the disc and includes a protrusion for contacting a second side of the disc. A foot is movably mounted adjacent the shaft contact surface in a manner spaced from the claw for selectively contacting the second side of the disc. A means is provided for moving the foot to bring the foot into contact with the second side of the disc.

Preferably, the means for moving comprises an operator mounted on the shaft second end. The means for moving can further comprise a longitudinally extending bore located in the shaft and a plunger secured at a first end to the foot and secured at a second end to the operator wherein the plunger is mounted in the bore. A biasing means can be provided for urging the operator in a first direction in relation to the shaft. The biasing means can comprise a spring mounted between the shaft second end and the operator.

Preferably, the contact surface has a length which is greater than a diameter of the aperture of the disc so that opposed ends of the contact surface touch opposed edges of the disc adjacent the aperture. The means for moving can comprise an operator and a plunger having a first end which selectively contacts the foot and a second end operably secured to the operator. Alternatively, the means for moving can comprise an operator and a shaft having a first end operably contacting the foot and a second end secured to the operator.

One advantage of the present invention is the provision of a new and improved compact disc handling device.

Another advantage of the present invention is the provision of a compact disc handling device which is provided with a resiliently biased operator. When the operator is depressed, the tool allows a compact disc to be picked up.

Still another advantage of the present invention is the provision of a compact disc handling tool which allows a compact disc to be removed from its jewel case, transported from the jewel case to a compact disc player and back again to the jewel case without being touched by the digits of a person.

Yet another advantage of the present invention is the provision of a compact disc handling tool which has a shaft extending at a 450 angle to the plane of the compact disc in order to provide an ergonomic design which does not obstruct the view of the person handling the tool.

Yet still another advantage of the present invention is the provision of a flat compact disc handling tool which can, itself, be packaged in a standard size jewel box of the type which is used for the compact discs themselves.

An additional advantage of the present invention is the provision of a compact disc handling tool which prevents the smudging or scratching of the information carrying faces of the compact disc since a person's digits need not touch the disc itself.

A further advantage of the present invention is the provision of a compact disc handling tool which lessens the possibility that the compact disc will be dropped thereby breaking the disc.

A still further advantage of the present invention is the provision of a compact disc handling tool which, due to its ease of use, is of particular benefit to people who have limited use of their hands.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, several embodiments of which will be described in detail in this specification and illustrated in the accompanying drawings which form a part hereof and wherein:

FIG. 4 is a side elevational view of a lower end of a compact disc handling tool according to a second embodiment of the present invention;

FIG. 5 is a side elevational view of a lower end of a compact disc handling tool according to a third embodiment of the present invention;

FIG. 6 is a side elevational view of a top end of a compact disc handling tool according to a fourth embodiment of the present invention;

FIG. 7 is a cross-sectional view through a shaft of the compact disc handling tool of FIG. 4; and, FIG. 8 is a cross-sectional view through a handle portion of a compact disc handling tool according to a fifth embodiment of the present invention.

DETAILED DESCRIPTION OF THE PREFERRED EMBODIMENTS

Figure 1:
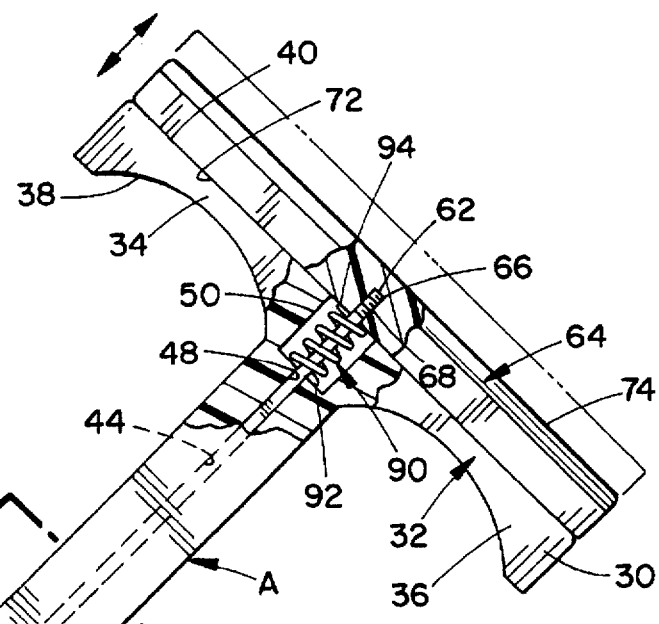
FIG. 1 is a side elevational view in partial cross-section of a compact disc handling tool according to a first embodiment of the present invention, the tool being shown in its actuated state.

Referring now to the drawings wherein the showings are for purposes of illustrating several embodiments of the invention only and not for purposes of limiting same, FIG. 1 shows a tool A for picking up a compact disc B from the "jewel case" in which compact discs are normally sold for transfer to a player mechanism for the compact disc or vice versa. The compact disc can be an audio compact disc or CD, a computer CD-ROM, a video disc, a laser disc or a DVD.

In a preferred embodiment, as illustrated in FIG. 1, the tool A can comprise a shaft 10 having a first end 12 on which there is provided an angled contact surface 14. The contact surface is disposed at an acute angle in relation to the longitudinal axis of the shaft 10. Preferably, the contact surface 14 is disposed at a 45° angle in relation to a longitudinal axis of the shaft 10. It should be appreciated that other angles could also be provided if so desired.

Figure 3:
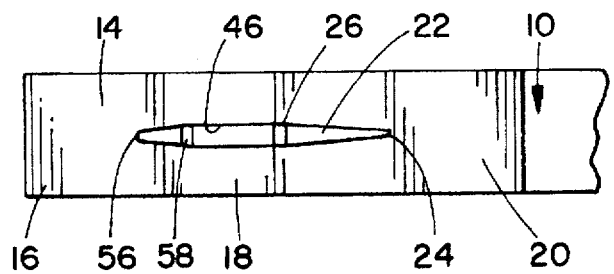
FIG. 3 is a greatly enlarged bottom plan view of the tool of FIG. 1.

With reference now to FIG. 3, the contact surface 14 comprises a first end 16, a middle section 18 and a second end 20. A claw 22 protrudes from the middle section 18 of the contact surface 14. The claw is somewhat wedge-shaped in cross-section so that it comprises a thin end 24 and a thick end 26. It can be seen from FIG. 1 that the thin end 24 protrudes in order to grip the compact disc B.

A second end 30 of the shaft comprises a handle section 32 which includes a first member 34 extending in a first direction normal to the shaft 10 and a second member 36 extending in the opposite direction. The handle members each have a curved lower surface 38 in order to accommodate the digits of the operator. The handle members also have a planar upper surface 40. Extending longitudinally through the shaft 10 is a bore 44. The bore has a first end 46 which terminates at the contact surface 14 and a second end 48 which terminates in an enlarged cavity 50 that is located in the handle 32. The cavity terminates at the planar upper surface 40 of the handle.

Slidably mounted in the bore 44 is a shaft 52 having a first end or foot 54. As can be best seen from FIG. 3, the first end is somewhat wedge-shaped in cross-section so as to have a thin end 56 and a thick end 58. In order to prevent rotation of the shaft 52 in the bore 44, the shaft 52 can have a somewhat square cross-section so as to have four planar walls 60 of substantially equal width (see FIG. 2). Obviously, the bore 44 is shaped to accommodate the shaft 52. Of course, other rotation-preventing cross-sections of the shaft, and mating shapes of the bore, can also be provided.

The shaft also includes a second end 62 which can be secured by suitable means such as adhesive or threading in an operator 64. As can be seen, the second end 62 of the shaft is provided with suitable threading 66 so that it can be secured in place in a threaded aperture 68 extending into the operator. Of course, if the shaft second end is threaded, it is also rounded so that it can be rotated in relation to the operator to secure the shaft on the operator. The operator has a first surface 72 which selectively contacts the planar upper surface 40 of the handle 32. The operator also has a second surface 74 which is selectively contacted by the palm of a person wishing to employ the tool A.

Located in the cavity 50 is a spring 90. The spring has a first end 92 which contacts a bottom wall of the cavity 50 and a second end 94 which contacts the first surface 72 of the operator 64.

To use the tool, a person need merely bring the shaft first end 12 adjacent the compact disc B and then protrude the claw 22 through a central opening 80 of the compact disc B until the contact surface 14 contacts a first surface 82 of the compact disc. Then the tool needs to be moved sideways until the claw thin end 24 contacts a second surface 84 of the compact disc. Subsequently, the operator 64 can be depressed against the resistance of the spring 90 so as to eliminate a gap which exists between the operator first surface 72 and the handle upper surface 40. While this is happening, the shaft 52 is descending in the bore 44 so that the shaft first end 54 extends away from the bore first end 46. Such movement continues until the operator first surface 72 contacts the handle upper surface 40. At this time, the thin end 56 of the operator first end 54 will contact the second surface 84 of the compact disc B. Once this is accomplished, the compact disc is held on opposed sides of its aperture 80 on both its upper and lower surfaces 82 and 84. The disc can then be lifted away from its subjacent support surface. That support surface can be either a CD player employed in a computer or an audio player or it can be the jewel case in which CDs are normally stored. Because of the narrowness of the claw first end 24 and the shaft first end 54, these two elements can fit between the several fingers which are conventionally used for holding the CD in the jewel case.

Figure 2:
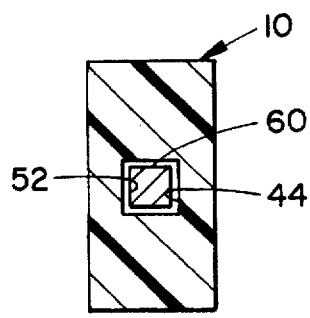
FIG. 2 is an enlarged cross-sectional view of the tool of FIG. 1 along line 2—2.

The tool A can be manufactured from any type of suitable material. A suitable conventional thermoplastic material is illustrated in FIGS. 1 and 2. However, it should be appreciated that other types of material can also be employed if so desired. It may be possible to employ a material which would limit static electricity buildup.

With reference now to FIG. 4, another type of tool C is there disclosed. In this tool, a shaft 110 includes on its first end 112 a contact surface 114. Protruding from the contact surface is a claw 116. A bore 120 extends through the shaft. The bore has a threaded first end 122. Rotatably mounted in the bore is a rod 130. The rod has a threaded section 132 which cooperates with the threaded first end 122 of the bore. Located on one end of the rod 130 is a foot 134. It is evident from arrow 136 that the rod 130 may be rotated thereby moving the foot 134 from its solid line position beneath the lower face of a compact disc B' to its dotted line position. In the latter position, the foot 134 has been rotated 180° so that it is no longer located beneath the lower surface of the compact disc B' but, rather, is located within the diameter of the central aperture 80' of the disc B'. Once so located, the tool C can be moved away from the disc B' However, when the shaft is rotated 180° to the solid line position illustrated in FIG. 4, the tool can be employed to pick up and move the disc B'.

FIG. 7 illustrates that the rod 130 of the tool C of FIG. 4 is circular and is capable of rotating in a circular bore 120 of the shaft 110. This is in contrast with the square rod and bore illustrated in FIG. 2.

With reference now to FIG. 5, another type of tool D is there illustrated. In this embodiment, the tool comprises a shaft 140 having a first end 142 on which is provided a contact surface 144. Protruding from the contact surface is a claw 146. Extending through the shaft 140 is a bore 150 having a first end 152. A rod 160 extends through the bore. The rod has a first end 162 with a tapered surface 164. The rod 160 can reciprocate in the bore 150 as is illustrated by the arrow 166.

The tapered surface 164 of the rod is adapted to contact a back surface 170 of a foot 172 which is pivotally mounted via a pivot 174 to the shaft 140. A spring 176 biases the foot 172 into a retracted position within a cavity 178 defined in the shaft contact surface 144. It is noted that the bore first end 152 terminates in the cavity 178.

By reciprocating the rod 160 in relation to the shaft 140, the tapered surface 164 at the first end of the rod can be selectively brought into contact with the back surface 170 of the foot 172. When this is done, the foot is pivoted outwardly of the shaft 140 as is illustrated in solid lines so as to engage the bottom face of a disc B" when extending through a central aperture 80" thereof. When this is done and the claw 146 is positioned as illustrated in FIG. 5, the disc can be lifted and moved by the tool D. If, however, the rod 160 is retracted, the spring 176 will bias the foot 172 into a retracted position as illustrated in dotted outline. When this occurs, a tip 180 of the foot is located within the diameter formed by the central aperture 80" of the disc B" In this condition, the tool D can be moved away from the disc B".

With reference now to FIG. 6, another type of tool E is there illustrated. This tool comprises a handle 190 having a trigger 192 which is pivotally mounted in the handle by a pivot 194. A protrusion 196 of the trigger slidably contacts a first end 198 of a rod 200 which extends through a bore 202 located in the handle 190 and an attached shaft 204. It should be apparent that the trigger pivots around pivot 194 so that the protrusion 196 pushes down on rod 200 to move it. The handle construction illustrated in FIG. 6 can be employed with the tool D of FIG. 5.

Figure 8:
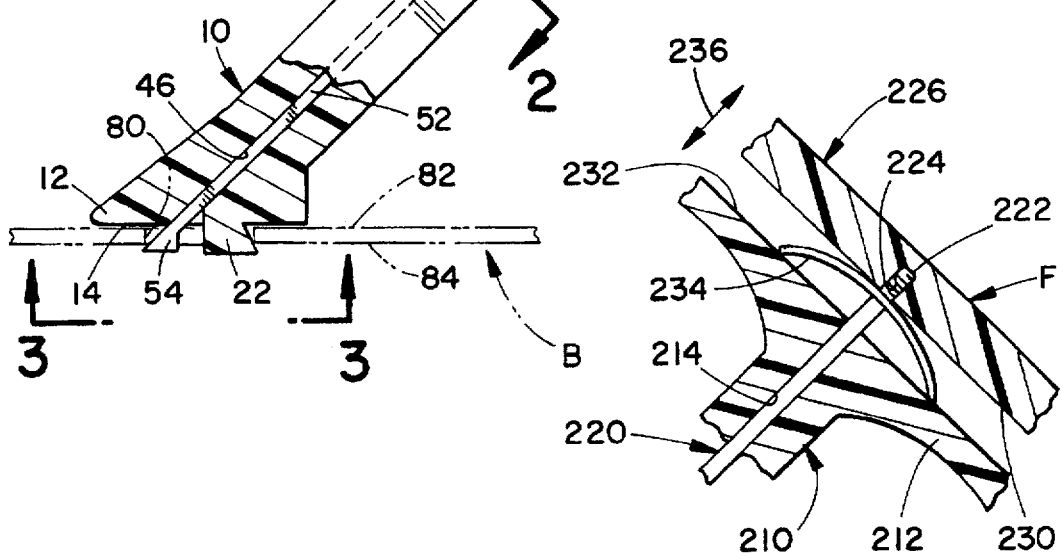

With reference now to FIG. 8, still another embodiment of a tool F is there illustrated. In this embodiment, a shaft 210 has located at one end a handle 212. A bore 214 extends longitudinally through the shaft. A rod 220 is positioned in the bore. The rod has a threaded first end 222 which engages in a threaded bore 224 of an operator 226. The operator has a lower surface 230 which selectively approaches an upper surface 232 of the handle 212. Disposed between the handle and the operator is a leaf spring 234. The leaf spring biases the operator 226 away from the handle. When the operator and handle are gripped manually, a person can move the operator 226 towards the handle as illustrated by arrow 236. This enables the rod 220 to be advanced in relation to the shaft 210.

It should be evident from the several views provided herein that the disc tool is preferably relatively thin. In this way, the tool can be packaged in a standard jewel box and sold along with the discs themselves.

The invention has been described with reference to several embodiments. Obviously, modifications and alterations will occur to others upon a reading and understanding of this specification. It is intended to include all such modifications and alterations insofar as they come within the scope of the appended claims or the equivalents thereof.

What is claimed is:

1. A device for handling a disc having an aperture, the device comprising:
   a shaft having a first end and a second end;
   a contact surface located on said shaft first end for contacting a first side of the disc a plane of said contact surface extending at an acute angle in relation to a longitudinal axis of said shaft;
   a foot movably mounted adjacent said shaft contact surface for selectively contacting the second side of the disc;
   a plunger operably secured at a first end to said foot; and,
   a means for moving said plunger to bring said foot into contact with the second side of the disc.

2. The device of claim 1 wherein said means for moving comprises an operator mounted on said shaft second end.

3. The device of claim 2 wherein said means for moving further comprises:
   a longitudinally extending bore located in said shaft, wherein said plunger is mounted in said bore; and,
   wherein said plunger is operably secured at a second end to said operator.

4. The device of claim 3 further comprising a biasing means for urging said operator in a first direction in relation to said shaft.

5. The device of claim 4 wherein said biasing means comprises a spring mounted between said shaft second end and said operator.

6. The device of claim 1 wherein said contact surface has a length which greater than a diameter of the aperture of the disc so that opposed ends of said contact surface touch opposed edges of the disc adjacent the aperture.

7. The device of claim 1 further comprising a claw extending away from said contact surface, said claw having a length which is greater than a thickness of the disc and including a protrusion for contacting a second side of the disc.

8. The device of claim 1 wherein said means for moving comprises:
   an operator; and,
   wherein a second end of said plunger is secured to said operator.

9. A device for handling a disc having an aperture, the device comprising:
   a shaft having a first end and a second end;
   a contact surface on said shaft first end for contacting a first side of the disc, a plane of said contact surface extending at an acute angle in relation to a longitudinal axis of said shaft;
   a claw extending away from said contact surface, said claw having a length which is greater than a thickness of the disc and including a protrusion for selectively contacting a second side of the disc;
   a foot movably mounted adjacent said shaft contact surface for selectively contacting the second side of the disc, at a location spaced from said protrusion; and,
   a means for moving said foot to bring said foot into contact with the second side of the disc.

10. The device of claim 9 wherein said means for moving comprises an operator mounted on said shaft second end.

11. The device of claim 10 wherein said means for moving further comprises:
    a longitudinally extending bore located in said shaft; and,
    a plunger secured at a first end to said foot and secured at a second end to said operator wherein said plunger is mounted in said bore.

12. The device of claim 11 further comprising a biasing means for urging said operator in a first direction in relation to said shaft.

13. The device of claim 12 wherein said biasing means comprises a spring mounted between said shaft second end and said operator.

14. The device of claim 9 wherein said contact surface has a length which greater than a diameter of the aperture of the disc so that opposed ends of said contact surface touch opposed edges of the disc adjacent the aperture.

15. The device of claim 9 wherein said means for moving comprises:

an operator; and, a plunger having a first end which selectively contacts said foot and a second end operably secured to said operator.

16. The device of claim 9 wherein said means for moving comprises:

an operator; and, a shaft having a first end operably contacting said foot and a second end secured to said operator.

17. A device for handling a disc having an aperture, the device comprising:

a shaft having a first end and a second end;

a contact surface located on said shaft first end for contacting a first side of the disc, a plane of said contact surface extending at an acute angle in relation to a longitudinal axis of said shaft;

a claw extending away from said contact surface, said claw having a length which is greater than a thickness of the disc and including a protrusion for selectively contacting a second side of the disc;

a foot movably mounted adjacent said shaft contact surface for selectively contacting the second side of the disc, at a location spaced from said protrusion;

a handle connected to said shaft second end;

a plunger having a first end cooperating with said foot and a second end; and, an operator for moving said foot to bring said foot into contact with the second side of the disc, said plunger second end being connected to said operator.

18. The device of claim 17 further comprising a biasing means for urging said operator in a first direction in relation to said shaft.

19. The device of claim 18 wherein said biasing means comprises a spring mounted between said shaft second end and said operator.

20. The device of claim 19 further comprising a longitudinally extending bore located in said shaft, said plunger being mounted in said bore.

* * * * *